Figures 1, 2:
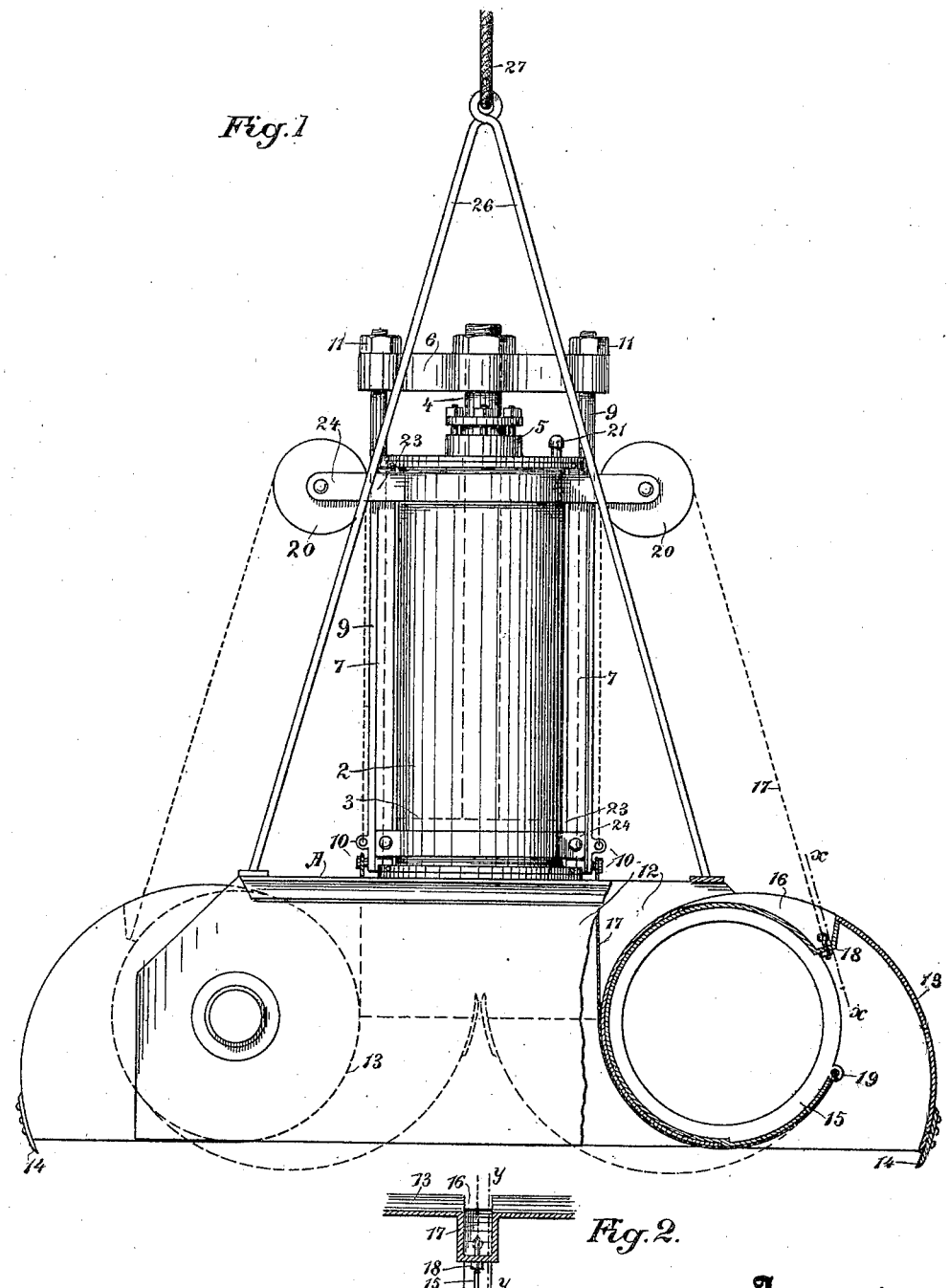

No. 652,395. Patented June 26, 1900.
I. P. LAMBING.
EXCAVATOR.
(Application filed Mar. 15, 1900.)
(No Model.) 2 Sheets—Sheet 1.

Witnesses,

Inventor,
By Isaac P. Lambing
Dewey Strong & Co.
Atty

No. 652,395. Patented June 26, 1900.
I. P. LAMBING.
EXCAVATOR.
(Application filed Mar. 15, 1900.)
(No Model.) 2 Sheets—Sheet 2.
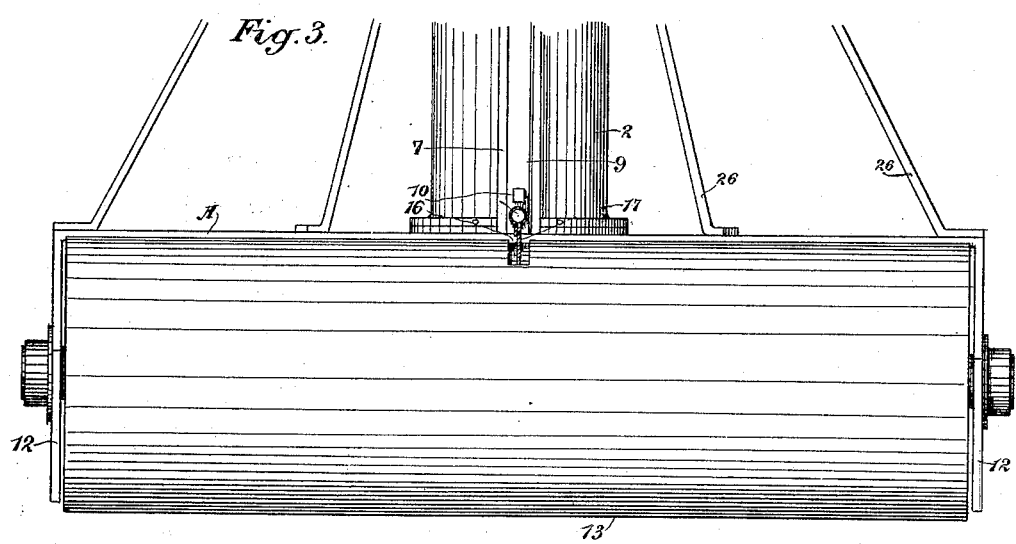
Witnesses,
Inventor,
By Isaac P. Lambing
Dewey Strong & Co
Attys

UNITED STATES PATENT OFFICE.

ISAAC P. LAMBING, OF DENVER, COLORADO.

EXCAVATOR.

SPECIFICATION forming part of Letters Patent No. 652,395, dated June 26, 1900.

Application filed March 15, 1900. Serial No. 8,699. (No model.)

*To all whom it may concern:*

Be it known that I, ISAAC P. LAMBING, a citizen of the United States, residing at Denver, county of Arapahoe, State of Colorado, have invented an Improvement in Excavators; and I hereby declare the following to be a full, clear, and exact description of the same.

My invention relates to apparatus for excavating and moving earth or like material. It consists of revoluble journaled buckets having closed ends and a scroll-shaped or like periphery, the curvature of which increases outward from the periphery of the bucket to the cutting edges. These buckets are so journaled that when reversed the outer cutting edges are presented downwardly, so that when rotated through the material to be excavated they cut out a sufficent portion to fill the bucket, and as they approach each other these cutting edges are turned upwardly, so as to lie side by side in parallel vertical planes without intersecting. These buckets are provided with one or more circular pulleys and ropes, chains, or other flexible connections at opposite sides of the pulleys, whereby they may be rotated to open and to fill themselves.

The operating ropes or chains are connected with a vertically-slidable piston of a cylinder mounted upon a base-plate which carries the bucket-journals, and steam, air, or other medium under pressure may be employed to reciprocate the piston and actuate the buckets.

My invention also comprises details of construction, which will be more fully explained by reference to the accompanying drawings, in which—

Figure 1 is a front elevation of the excavator, one bucket being shown in section on line *y y* of Fig. 2. Fig. 2 is a detail section of the bucket on line *x x* of Fig. 1. Fig. 3 is a side elevation of a bucket and connection. Fig. 4 is an interior view of the same. Fig. 5 is a top view of the guide and slide-bar.

This apparatus is especially designed to excavate gold-bearing sand or gravel.

A is a base-plate of suitable material and dimensions, and upon this is fixed a cylinder 2, secured in any suitable or desired manner. Within this cylinder is a piston 3, having a piston-rod 4 extending through a stuffing-box 5 in the end of the cylinder and connected with a cross-head 6.

Upon opposite sides of the cylinder are guides 7. These guides may be made in any suitable form and stand parallel with the sides of the cylinder and the line of motion of its piston and piston-rod. As at present shown, these bars are channeled, having tongues which engage with corresponding slots 8 in slide-bars 9, which are adapted to move up and down and are retained in place by the guides 7. These guides may be secured to the cylinder in various ways. I have found a very satisfactory way to be by means of semicircular straps 23, extending around the upper and lower ends of the cylinder and having outwardly-turned ends 24, between which the upper ends of the guides 7 are clamped by means of bolts passing through holes in the ends 24 and in the ends of the guides, so that when screwed up tight they secure the guides and prevent them from moving out of place. These strap ends 24 may be extended to form bearings for the pulleys 20. Both ends of the guides may be fitted into slots formed in the flanges of the cylinder heads and covers, so that they will be maintained in proper alinement, and these slots allow the slides to move up and down beyond the cylinder ends, and the slides thus steady the piston-rod in its movements. The lower ends of the slides 9 have eyes or other equivalent fastenings 10 for the attachment of flexible ropes or chains, which actuate the buckets, to be hereinafter described. The upper ends of the slides are forged into cylindrical form and extend up through the cross-head 6, as shown, being secured in place by nuts, as at 11. By this construction it will be seen that the vertical reciprocations of the piston will be transmitted to move the slides in unison with it, and the movement of the slides is communicated to the attached ropes or chains. From the sides and opposite edges of the base A the plates 12 extend downwardly, and these plates support the shafts or journals about which the buckets are turnable.

The peripheries of the buckets 13 are made in the form of a scroll curving outwardly and terminating in excavating teeth or edges 14 of any suitable or desired description, which will depend upon the character of the material to be excavated. The space between the outer excavating edges and the inner edges of the box 13 forms an open channel through which the material can pass into the buckets when the latter are rotated for that purpose and through which it may be afterward discharged.

The buckets are journaled upon the axis of their smaller circular portion, and it will be seen that when they are reversed, so that the cutting edges rest upon the surface of the ground, a rotation of the buckets toward each other will cut out a portion of the material for each bucket, which will pass into the bucket. The weight of the apparatus will insure the operation of the excavators. These buckets are separated to such a distance that when they have been rotated so as to bring the cutting edges into a vertical plane they stand side by side, but never engage or interlock. Thus each bucket does its own work of excavation without relation to the other, and there is no danger of breaking the teeth or of catching stones or large objects between them. The scroll shape of the buckets prevents any rubbing friction on the outside, since the cutters are farthest from the center, and as the buckets revolve their shape carries the rest of the periphery away from the outer line of cut. In order to connect these buckets with the reciprocating slides 9 previously described, I have shown one or more circular pulleys 15. If more than one of these pulleys is used, they may be placed in any suitable relation with the closed ends of the buckets; but I have here illustrated the device as provided with a single pulley located centrally between the ends of each bucket. The periphery of the pulley follows the curvature of the bucket 13 as far as the latter is essentially cylindrical. Then as the scroll portion of the periphery leaves this curvature a groove or channel 16 is made through the periphery of the bucket to allow one end of the rope or chain 17 to be attached to the pulley at the point 18. The pulley continues its circular form within the bucket, and the channel 16 is closed at the sides. The opposite end of the rope or chain is attached to the pulley. At a point within the bucket, as shown at 19, the bight of the rope or chain passes over pulleys 20, journaled near the upper end of the cylinder, as shown, and at the point 10 these ropes or chains are fastened to the slides 9, as previously described. It will thus be seen that when the piston is moved upwardly it acts upon that portion of the rope or chain which passes around the pulley inside of the bucket and by its motion revolves the pulley and the bucket, so that the latter fills itself and is brought to its upright position to retain its load. When the piston is moved down, the outer portion of the chain or rope, which is connected at 18, will pull upon the outer side of the bucket over the pulley 20 and will thus rotate it outwardly to discharge its load at any point to which the apparatus may be swung by its derrick. It will be understood that either ropes or chains may be used or a part may be of rope and a part of chain, as may be found best.

The operation will then be as follows: The piston being at the bottom of the cylinder, the medium which is to be employed under pressure is admitted by suitable cock or valve through a pipe, as shown at 21, and forcing the piston upward the slides 9 move with it. As the rope or chain is connected with the slides, it will be caused to move around the pulley 20, and one end being connected at 19 and the other at 18 it will rotate the pulley and with it the bucket which is connected with it. When the piston is at the bottom of the cylinder, the buckets are in the reverse position, as shown in Fig. 1, with the cutting points or edges 14 in position to be forced into the material upon which the buckets stand. When the piston has reached the top of the cylinder, the buckets will have made approximately a half-revolution upon their axis and the cutting edges will have passed through the material, excavating enough to fill the buckets each independently, and the cutting edges will then stand pointing upwardly and parallel with each other beneath the base-plate and cylinder.

The apparatus is suspended from a derrick-boom or other working apparatus of similar character, so that the whole of the herein-described apparatus may be raised or lowered and transferred to any desired point. 26 are hangers or yokes fixed to the base-plate for the attachment of the suspending and hoisting ropes 27. Thus after the buckets have been filled the device is raised, swung around to any point, and the piston is then moved to the bottom of the cylinder and the buckets will be reversed, so as to discharge their load.

It will be seen that the pulleys 15 fit within the cylindrical part of the buckets, and the outer peripheries of the buckets thus form a continuation of the pulleys, so that the ropes or chains after leaving the slots or channels 16 of the buckets will wind and unwind upon the outside of that part of the buckets as they rotate, following the line of the pulley which is within the bucket. The other part of the rope which is connected with the pulley on the opposite edge follows the periphery of the pulley within the bucket.

Having thus described my invention, what I claim as new, and desire to secure by Letters Patent, is—

1. The combination with journaled rotary scroll-shaped buckets the inner portions of which form cylindrical segments, of a vertical cylinder, a piston reciprocable therein, and connections between the cylinder and the cylindrical portions of the buckets whereby the movements of the piston are transmitted to rotate the buckets.

2. Rotary journaled buckets having scroll-shaped extensions and cutting edges, one or more pulleys fixed within the buckets having flexible ropes or chains connected therewith at opposite sides, a vertical cylinder having a piston reciprocable therein, and connections between said piston and the ropes or chains whereby the buckets are rotated by the reciprocation of the piston.

3. In an excavator, horizontally-journaled scroll-shaped buckets having the outer edges adapted to excavate, one or more pulleys fixed with relation to the buckets, ropes or chains having their ends attached to the edges of the pulleys, a cylinder having a piston reciprocable therein, slides with which said piston is connected, and movable in unison therewith, connections between the ropes and said slides and pulleys journaled to the cylinder over which the bights of the ropes pass whereby the reciprocations of the piston produce rotary motions of the excavating-buckets.

4. A cylinder, a base-plate upon which it is supported extensions at opposite sides of the base-plate forming journal-supports for a pair of oppositely-rotating scroll-shaped buckets, slides guided and movable upon opposite sides of the cylinder, a piston movable within the cylinder, a cross-head with which the piston-rod and the slides are connected, pulleys fixed to the rotary excavators, ropes or chains having their ends attached to the pulleys, other pulleys journaled to the cylinder over which the bights of the ropes or chains pass, and connections by which the ropes are fastened to the slides.

5. A base-plate having extensions at opposite sides, rotary scroll-shaped excavators journaled between said extensions, pulleys fixed to the excavating-buckets and having attachments for the ends of the ropes or chains, a cylinder mounted upon the base-plate having a reciprocable piston and piston-rod, a cross-head with which said piston-rod is connected, vertical guides upon opposite sides of the cylinder, slides movable in said guides having the upper ends connected with the cross-head, means for attaching the ropes to said slides, and pulleys journaled upon the cylinder over which the bights of the ropes pass to convert the reciprocating motion of the piston and slides into a rotary motion of the buckets.

6. An excavator composed of horizontally-journaled buckets having scroll-shaped extensions and excavating edges movable to and from each other without intersection, said buckets having pulleys fixed within them, and channels made in the exterior peripheries of the scroll portion of the buckets, ropes or chains having one end attached to the pulleys within these channels, and the other end extending around the pulleys in the opposite side to a point of attachment, a cylinder and a support intermediate between said buckets having pulleys journaled thereto, over which pulleys the bights of the ropes pass, vertically-guided slides to which the ropes are secured, a cross-head to which the upper ends of the slides are connected, and a piston movable within the cylinder, the rod of which is connected with the cross-head.

7. In an excavator, independently journaled and revoluble scroll-shaped buckets, the inner portions of which form cylindrical segments, pulleys fixed within the buckets concentric with the cylindrical segments, slots through the scroll portions of the buckets in the plane of the pulleys, whereby the operating-ropes run partly upon the pulleys and partly upon the outside of the buckets.

In witness whereof I have hereunto set my hand.

ISAAC P. LAMBING.

Witnesses:
S. H. NOURSE,
JESSIE C. BRODIE.